A. BRIGDEN.
INSECT CATCHER.
APPLICATION FILED JUNE 10, 1921.
1,414,068.
Patented Apr. 25, 1922.
2 SHEETS—SHEET 1.
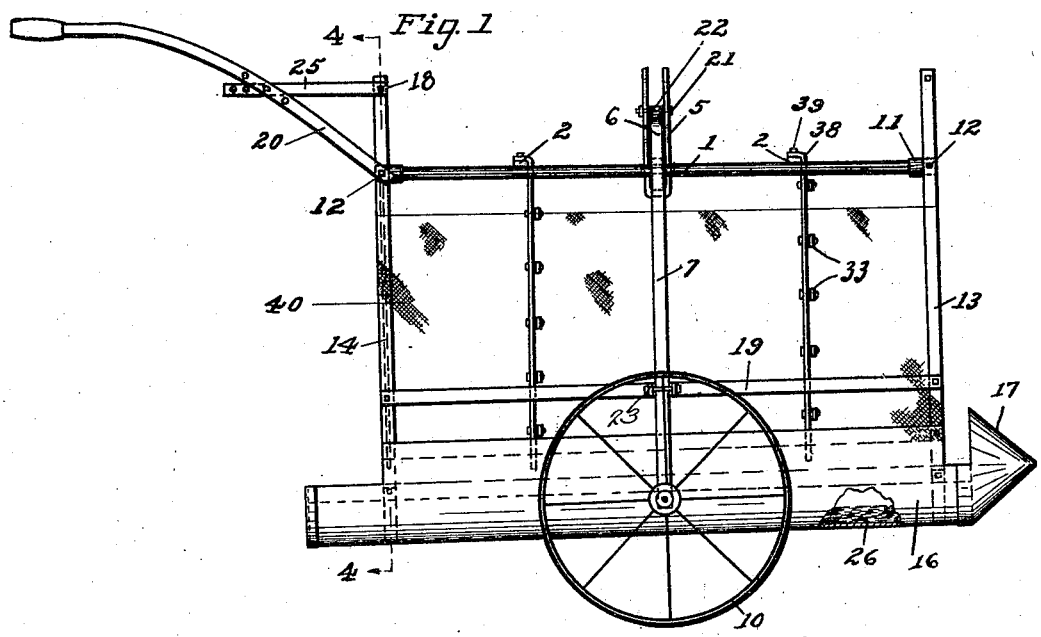
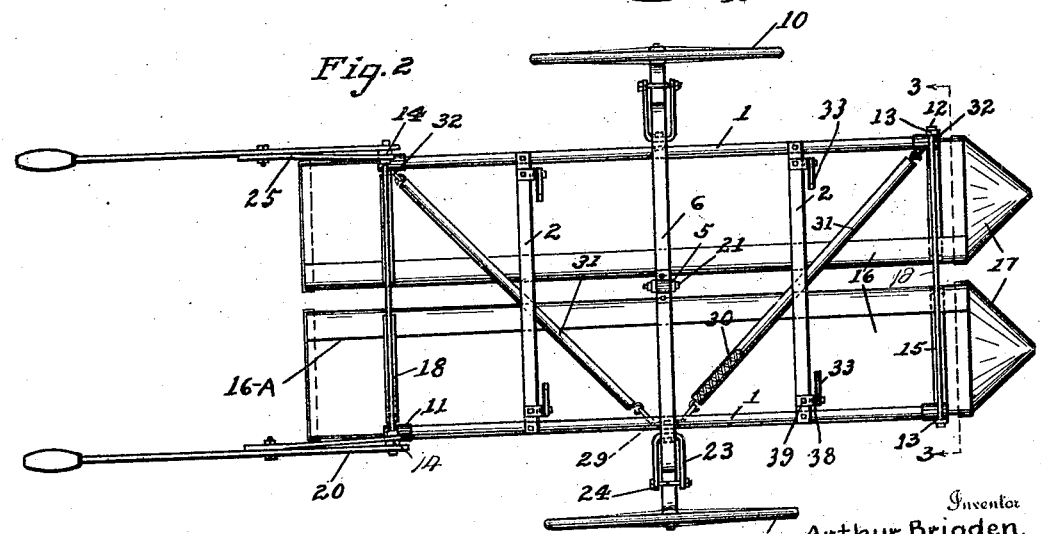
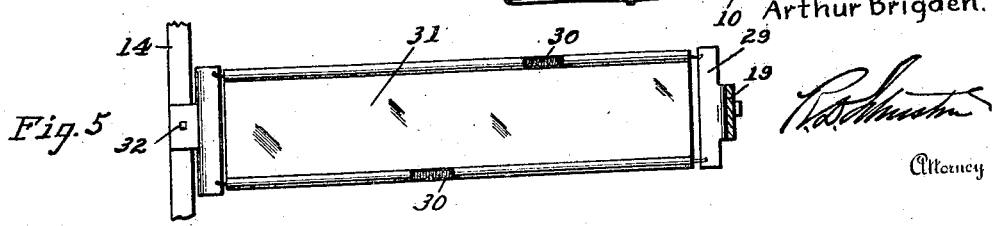
Inventor
Arthur Brigden.
Attorney

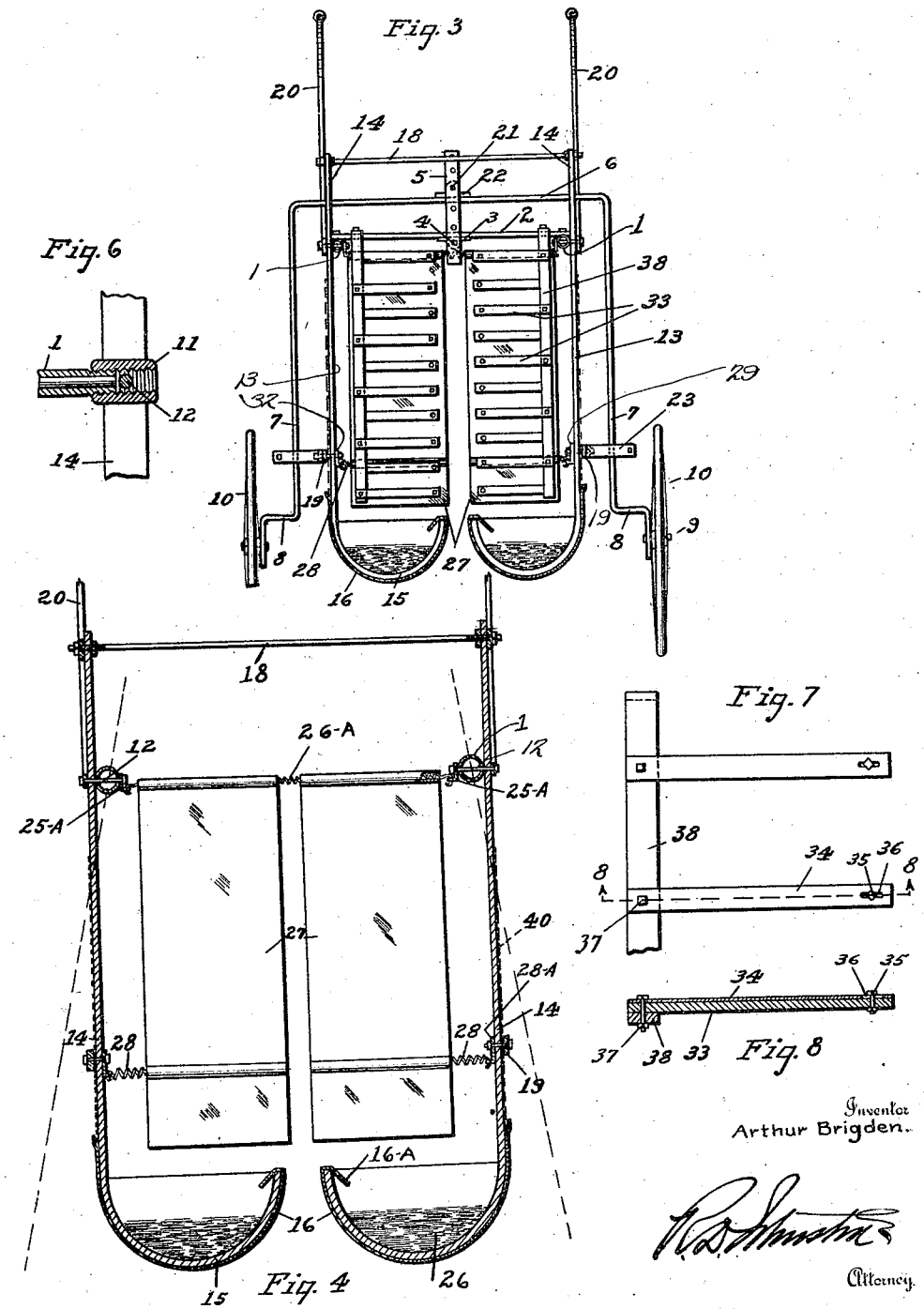

UNITED STATES PATENT OFFICE.

ARTHUR BRIGDEN, OF BIRMINGHAM, ALABAMA.

INSECT CATCHER.

1,414,068.   Specification of Letters Patent.   Patented Apr. 25, 1922.

Application filed June 10, 1921. Serial No. 476,414.

*To all whom it may concern:*

Be it known that I, ARTHUR BRIGDEN, a citizen of the United States of America, residing at Birmingham, in the county of Jefferson and State of Alabama, have invented certain new and useful Improvements in Insect Catchers, of which the following is a specification.

This invention relates to an insect catching machine adapted to travel on two wheels and especially designed for free lateral and longitudinal angular play to enable the machine to accommodate itself easily and effectively in working an irregular row of plants.

One important feature of my invention is the simple and effective means devised for the relative adjustment of the troughs which catch the insects that are shaken or dislodged from the plants over which the apparatus is moved.

A further feature of my invention is to simplify and perfect the means for converting the machine for treating plants in different stages of their growth.

The various novel features of my construction and their advantages will be better understood by reference to the detailed description which follows and to the claims appended thereto, reference being had to the accompanying drawings which illustrate my invention only in its preferred embodiment, and in which:—

Fig. 1 is a side elevation of my machine with one trough partly broken away.

Fig. 2 is a plan view of the machine showing the diagonal curtains in plan and the fingers moved out of operative position.

Fig. 3 is a front elevation of the machine showing the troughs in section on the line 3—3 of Fig. 2, with the fingers in operative position.

Fig. 4 is an enlarged detail sectional view taken on the line 4—4 of Fig. 1.

Fig. 5 is a detail view of one of the diagonal lower curtains and its bracket supports.

Fig. 6 is a detail view showing the swivelled mounting for the cross supporting bars.

Fig. 7 is a rear fragmental view of one of the finger bars; and

Fig. 8 is a longitudinal sectional view taken on the line 8—8 of Fig. 7.

Similar reference numerals refer to similar parts throughout the drawings.

My invention as illustrated comprises a main frame formed by spaced longitudinal side pipes 1 which are cross connected at their centers and between the center and each end by cross bars 2, the ends of which are bolted to the pipes. The middle cross bar has attached to the center of its underface a swivel bracket 3 which receives a swivel pin 4 by which the frame is suspended by a U-shaped clip 5 which straddles the center of a bent axle frame 6. This axle frame has its sides 7 bent down at right angles to its top portion 6 and then bent outwardly at 8 to receive the axles 9 upon which the wheels 10 are journaled.

On each end of each pipe 1 I screw a threaded sleeve 11 which projects sufficiently beyond the end of the pipe 1 to permit a cross pin 12 to be inserted therethrough beyond the pipe 1 and this pin is utilized to mount the front and rear trough support bars 13 and 14, respectively, on the frame. Both bars 13 and 14 have their lower ends bent inwardly on a curve at 15 and conform to the curve of the trough 16 which receives such curved end 15 and is suitably attached thereto. The forward ends 17 of the troughs are made conical to better guide the machine astride the row of plants and prevent the troughs digging into the ground if tilted too far forward. The upper ends of these bars 13 and 14 extend upwardly above the pipe sleeves 11 and each opposite pair is cross connected at their upper ends by a screw bolt 18 having both ends threaded so that by the use of a pair of nuts on each end of the bolt the bars 13 and 14 can be drawn together or spread apart at their upper ends and in doing so they are caused to swivel by the turning of the sleeves 11 on the pipe 1 and thus to swing the troughs together or farther apart according to the adjustment desired. The adjacent bars 13 and 14 on the same side of the machine are connected near their lower ends by side bars 19 and suitable handle bars 20 are provided with their lower ends attached to the rear side bars 14 by bolts 12 which attach said bars to the sleeve 11. Braces 25 serve to adjustably connect the handles to the upper ends of bars 14 and permit, by the provision of extra bolt holes in the braces and handle bars, the desired vertical adjustment of the handles. The yoke 5 which straddles the axle frame 6 is provided with a series of bolt holes therein by means of which the yoke may be attached at the desired height by means of a longitudinal swivel pin 21 passing through a bearing 22 mounted on the center of the top of the axle 6. I attach to said bars 19 at their centers a guide yoke 23 which receives the down turned ends 7 of the axle free to play laterally therein but confined against moving entirely out of the yokes by a cross bolt 24 through the outer end of each yoke. The troughs are semi-circular in shape with their rear ends closed by half circular plates and they are adapted to contain a body of suitable liquid 26 which will kill the insects that fall thereinto when dislodged from the plant by means which will now be described.

The inner ends of the rear bolts 12 (see Fig. 4) are used to attach brackets 25$^a$ to pipes 1 and each bracket is perforated so that the ends of a coil spring 26$^a$ may be attached thereto. This coil spring extends from side to side across the frame at its rear end and serves to support the upper ends of rear curtains 27 which near their lower ends are provided with transverse pockets to receive coil springs 28 which are suitably attached to brackets 28$^a$ bolted to the side bars 14 and extend inwardly to but not beyond the inner edge of the curtains and thus serve to yieldingly hold the lower ends of the curtains to their work while the spring 26$^a$ will yield to permit the curtains to work back and forth in passing the plants. The inner edges of the troughs are bent over and down to form inwardly overhanging lips 16$^a$ which prevent the splashing out of the liquid in the troughs.

When the machine is to be used for small cotton I attach to the double bracket 29, which is itself made fast to the center of one side bar 19, the inner ends of coil springs 30 upon each pair of which is stretched a curtain 31. The springs 30 at the forward end of the machine extend diagonally across and connect to an attachment plate 32 bolted to a forward bar 13 while the springs for the rear diagonal curtain are connected to a similar attachment plate 32 carried by a bar 14. The two curtains 31 are thus supported and arranged in opposite diagonal directions across the lower part of the machine. These curtains yieldingly engage the small plants, brushing them first over one trough and then over the other and dislodging all insects thereof into the troughs. As the plant grows larger the curtains are removed by detaching their ends from the plates 32 and bracket 29 and the shaker fingers are then employed. These fingers which are shown in detail in Figs. 7 and 8 are composed of a forward plant engaging strip of leather, linoleum, or like flexible material 33 backed by a steel spring plate 34, the strip and plate being connected at their outer ends by a bolt 35 which is free to work in an elongated slot 36 in the steel plate so as to permit free flexing of the composite fingers which at their inner ends are connected by a single bolt 37 to an upright spring steel bar 38, which bar at its upper end is bent over and is connected by a bolt 39 to the top of a cross bar 2 while its lower end is left free to yield lengthwise of the machine. I provide four of these bars 38 and I arrange them in transverse pairs having the fingers of each transverse pair relatively staggered and also having the fingers of the pair on the same side of the machine relatively staggered so that they will engage all parts of the plant and effectively shake it. If desired these fingers can be swung up out of operative position, as shown in Fig. 2, while the lower curtains 31 are used, or by taking out the bolts 39 the finger frames can be entirely removed from the machine and replaced when needed. Screen wire sides 40 have their lower ends inserted under the outer trough edges and are held in place by attachment to the bars 13 and 14 and by the side bars 19.

One of the chief advantages of attaching the fingers is that they can be vertically adjusted into and out of operating position so that where it is desired to use both the bottom curtains 31 and the fingers this can be done by turning up the lower fingers out of operating position, leaving the bottom diagonal curtains to display the plants laterally while the upper fingers that are left in operative position strike and shake the upper branches of the plants. A special advantage of this arrangement is that as the plant timbers fly back to position when released by the bottom spring mounted curtains, they will strike the fingers and be more effectively cleaned than where permitted to swing free on the return.

In operation, the handles 20 are grasped and the machine is pushed by hand with the wheels 10 straddling the row of plants. The frame is free for angular adjustment vertically on a transverse axis by rocking the axle 6 about the wheel journals 9 and the frame is also free for lateral swinging by the swivelling of its center suspension yoke 5 on the swivel bolts 4 and 21. The curtains 31 and 27 will yieldingly engage the plant limbs and will brush the insects thereon into the troughs. Where the fingers are used the back curtains will prevent the insects being knocked out of the rear end of the machine as the limbs spring past the yielding fingers and finger bars. To swing the troughs together or apart it is only necessary to adjust the nuts on the bolts 18 to obtain the desired width.

No claim is made herein to the details of the spring shaker means for dislodging the insects from the same, in view of divisional requirements, forming the subject matter of my pending application, Serial No. 484,490, filed the 13th day of July, 1921.

Having thus described my invention, what I claim as new and desire to secure by Letters Patent, is:—

1. An insect catcher comprising an arched axle having side wheel supports, a frame swung from the center of the axle and having lateral guide yokes which straddle the sides of the axle, insect dislodging and collecting mechanisms carried by the frame, and means attached to the frame for guiding the catcher.

2. An insect catcher comprising an axle having its sides bent down at right angles to its top, wheels mounted at the base of said sides, a swivel pin mounted crosswise of the center of the top of the axle, a frame work suspended by said pin free to swing laterally between the axle sides, handles attached to the frame to rock it angularly about the wheel axis, laterally elongated yoke guides on the sides of the frame to loosely engage the lower ends of the sides of the axle, removable cross members mounted in and serving to close the outer ends of said yoke guides, and means carried by the frame for the dislodging and collecting of insects.

3. In an insect catcher, a wheel supported frame, bottom troughs, vertical trough supporting arms mounted to rock laterally on the frame, transverse tie members connecting said arms and having means to contract or spread apart their lower ends for relative adjustment of the troughs, and means to dislodge insects from plants passing between the troughs.

4. In an insect catcher, an arched wheel supported axle, a frame supported by the axle, vertical front and rear side bars pivotally mounted at an intermediate point on the frame, troughs supported by the lower ends of said arms, cross bolts adjustably connecting the upper ends of said arms, and means for dislodging insects from the plants passing between the troughs.

5. In an insect catcher, a frame comprising longitudinal top side members, a sleeve screwed at each end on said members and projecting beyond the ends of the same, vertical trough supporting bars, each connected to an overhung end of a sleeve, means to connect said bars above the frame, insect collecting troughs supported free for lateral play on the lower ends of said bars, and means within the frame to dislodge insects into said troughs.

6. An insect catcher comprising a wheel supported frame comprising longitudinal top side pipes threaded at their ends, elongated sleeves screwed on and adapted to overhang the ends of said pipes, vertical bars bolted through the overhung ends of said sleeves and having their lower ends curved to form a trough support, the bars on each side of the frame forming a trough support, a trough mounted on each side of the frame in its said respective support, and means to adjustably connect the upper ends of transversely opposite bars.

7. An insect catcher comprising a wheel supported frame composed of longitudinal cross connected top members, vertical front and rear end members swivelly connected to each top member, troughs adjustably supported by the lower ends of the vertical members, tie bolts connecting the top ends of said vertical members and adapted to adjust the troughs relatively laterally, a handle attached to the rear end of said top frame, and plant shaking mechanisms interposed in the frame above the troughs.

8. An insect catcher comprising an arched wheel supported axle, a frame work suspended centrally therefrom free for lateral play, guides on the frame work to restrain it from swinging relatively to the axle in a longitudinal plane, said frame work comprising a top frame composed of said pipes and cross bars connecting the pipes, sleeves screwed on the ends of the pipes and projecting beyond the same, vertical front and rear bars attached to said sleeves and adapted to turn therewith to swing laterally about the pipe, troughs mounted on the lower ends of said vertical bars, and tie bolts adjustably connecting the upper ends of said arms above the top frame.

In testimony whereof I affix my signature.

ARTHUR BRIGDEN.

Witness:
NOMIE WELCH.